(12) United States Patent
Fujii et al.

(10) Patent No.: US 6,467,311 B1
(45) Date of Patent: Oct. 22, 2002

(54) DOUBLE FLAME POLISHING METHOD FOR FIBER PREFORMS

(75) Inventors: Hideki Fujii; Takaaki Nagao; Shoji Hoshino; Tadakatsu Shimada; Hideo Hirasawa, all of Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/487,342

(22) Filed: Jan. 19, 2000

(30) Foreign Application Priority Data

Jan. 19, 1999 (JP) .......................... 11-010023

(51) Int. Cl.[7] .......................... C03B 37/023
(52) U.S. Cl. .............. 65/385; 65/404; 65/65; 65/120
(58) Field of Search .............. 65/65, 120, 404, 65/384

(56) References Cited

U.S. PATENT DOCUMENTS

| | | | | |
|---|---|---|---|---|
| 5,211,730 A | * | 5/1993 | Kanimori | 65/120 |
| 5,674,305 A | * | 10/1997 | Ohga | 65/65 |
| 5,685,889 A | * | 11/1997 | Ohga | 65/120 |
| 5,843,199 A | * | 12/1998 | Lysson | 65/65 |
| 5,979,189 A | * | 11/1999 | Campion | 65/65 |
| 2001/0023598 A1 | | 9/2001 | Kohmura et al. | |

FOREIGN PATENT DOCUMENTS

| | | |
|---|---|---|
| DE | 195 13 862 A1 | 4/1995 |
| EP | 0 525 681 A1 | 2/1993 |
| FR | 0 440 130 A1 | 8/1991 |

OTHER PUBLICATIONS

Derwent–ACC–NO: 1981–9648OD, Abstractof SU 814910 Mar. 23, 1981 to Belyi, A T.*
Merriam Webster's Collegiate Dictionary (10th ed) 1990 p. 1161.*

* cited by examiner

*Primary Examiner*—John Hoffmann
(74) *Attorney, Agent, or Firm*—Pillsbury Winthrop LLP

(57) ABSTRACT

The optical fiber base material heat treatment method can be provided that the first flame polishing heats the surface of the optical fiber base material (106) with fixing a length of the optical fiber base material (106) and the second flame polishing heats the surface of the optical fiber base material (106) by lower temperature than the temperature of the heating of the first flame polishing.

16 Claims, 3 Drawing Sheets

DOUBLE FLAME POLISHING METHOD FOR FIBER PREFORMS

This patent application claims priority based on a Japanese patent application, H11-010023 filed on Jan. 19, 1999, the contents of which are incorporated herein by reference.

BACKGROUND OF INVENTION

1. Field of the Invention

The present invention is related to an optical fiber heat treatment method that can treat the surface of an optical fiber base material evenly by a flame, and an optical fiber manufacture method using said heat treatment method.

2. Description of Related Art

An optical fiber is manufactured from an optical fiber base material as the raw materials. Principal ingredient of an optical fiber base material is quartz glass. An optical fiber base material is heated and elongated to the predetermined diameter to be an optical fiber preform. An optical fiber preform is drawn to be an optical fiber.

If there are some damages and unevenness in the surface of an optical fiber base material, an optical fiber will be cut off during drawing the optical fiber base material to an optical fiber. Also, the ratio between core diameter and cladding diameter of the optical fiber become uneven. If impure foreign substances are attached to the surface of the optical fiber base material, quality of the optical fiber will be decrease. Furthermore, if residual strain inside an optical fiber base material is large, crack is caused with small impact during drawing or transporting of the optical fiber base material.

Therefore,. the surface of an optical fiber base material is prefer to be even and without impure foreign substances. Also, residual strain inside an optical fiber base material is prefer to be small. A flame polishing is usually performed to remove damages of the surface of an optical fiber base material and residual strain inside an optical fiber base material. The flame polishing heats the surface of the optical fiber base material to about 200° C. by a burner with rotating the optical fiber base material.

However, in this temperature, a part of quartz glass $SiO_2$ on the surface of an optical fiber base material is dissociated and becomes SiO. Therefore, the part of quartz glass $SiO_2$ is dispersed. SiO connects with the oxygen in the atmosphere, and becomes glass particles once again. Then, glass particles are attaches near the part of the surface of the base material heated by flame and clouds the surface of the base material.

This cloud can be removed by heating the base material with weak flame. But if heating isn't sufficient, strain remains inside the base material. Conversely, if heating is more than it is necessary, cloud will be occurred once again.

SUMMARY OF THE INVENTION

It is an objective of the present invention to provide an optical fiber heat treatment method and an optical fiber manufacture method used the heat treatment method to solve the problems above. The optical fiber heat treatment method can remove damages, unevenness, and unevenness cased by impure foreign substances of the surface of an optical fiber base material, residual strain inside an optical fiber base material, and cloud caused by the attachment of glass particles.

The optical fiber base material heat treatment method can be provided that the first flame polishing heats the surface of the optical fiber base material with flame while keeping a length of the optical fiber base material constant and the second flame polishing heats the surface of the optical fiber base material with flame by lower temperature than the temperature of the heating of the first flame polishing.

The optical fiber base material heat treatment method can be provided that the first flame polishing removes uneven parts of the surface of the optical fiber base material by the heating.

The optical fiber base material heat treatment method can be provided that the second flame polishing removes residual strain inside the optical fiber base material and cloud of the surface of the optical fiber base material by the heating.

The optical fiber base material heat treatment method can be provided that the first flame polishing at least heats locally uneven parts of the surface of the optical fiber base material, and the second flame polishing heats entire surface of the optical fiber base material.

The optical fiber base material heat treatment method can be provided that the first flame polishing heats the optical fiber base material so that the temperature of the surface of the optical fiber base material becomes approximately between 1800° C. and 2200° C.

The optical fiber base material heat treatment method can be provided that the second flame polishing heats the optical fiber base material so that the temperature of the surface of the optical fiber base material becomes approximately between 1000° C. and 1800° C.

The optical fiber base material heat treatment method can be provided that the flame is generated by burning combustible gas, which contains hydrogen, and supporting gas, which contains oxygen for supporting combustion.

The optical fiber base material heat treatment method can be provided that the flame is generated by burning combustible gas, which contains chain hydrocarbon, and supporting gas, which contains oxygen for supporting combustion.

The optical fiber base material heat treatment method can be provided that the first flame polishing heats the surface of the optical fiber base material with flame while keeping a length of the optical fiber base material constant, the second flame polishing heats the surface of the optical fiber base material with flame by lower temperature than the temperature of the heating of the first flame polishing, and drawing the optical fiber base material to filament-like form by heating the optical fiber base material generates the optical fiber.

The optical fiber manufacture method can be provided that the first flame polishing removes uneven parts of the surface of the optical fiber base material by heating.

The optical fiber manufacture method can be provided that the second flame polishing removes residual strain inside the optical fiber base material and cloud of the surface of the optical fiber base material by heating.

The optical fiber manufacture method can be provided that the first flame polishing at least heats locally the uneven parts of the surface of the optical fiber base material, and the second flame polishing heats entire surface of the optical fiber base material.

The optical fiber manufacture method can be provided that that the first flame polishing heats the optical fiber base material so that the temperature of the surface of the optical fiber base material becomes approximately between 1800° C. and 2200° C.

The optical: fiber manufacture method can be provided that that the second flame polishing heats the optical fiber base material so that the temperature of the surface of the optical fiber base material becomes approximately between 1000° C. and 1800° C.

The optical: fiber manufacture method can be provided that the flame is generated by burning combustible gas, which contains hydrogen, and supporting gas, which contains oxygen for supporting combustion.

The optical fiber manufacture method can be provided that the flame is generated by burning combustible gas, which contains chain hydrocarbon, and supporting gas, which contains oxygen for supporting combustion.

DETAILED DESCRIPTION OF THE INVENTION

The present invention will be explained in detail, using embodiments of the present invention.

Figure 1:
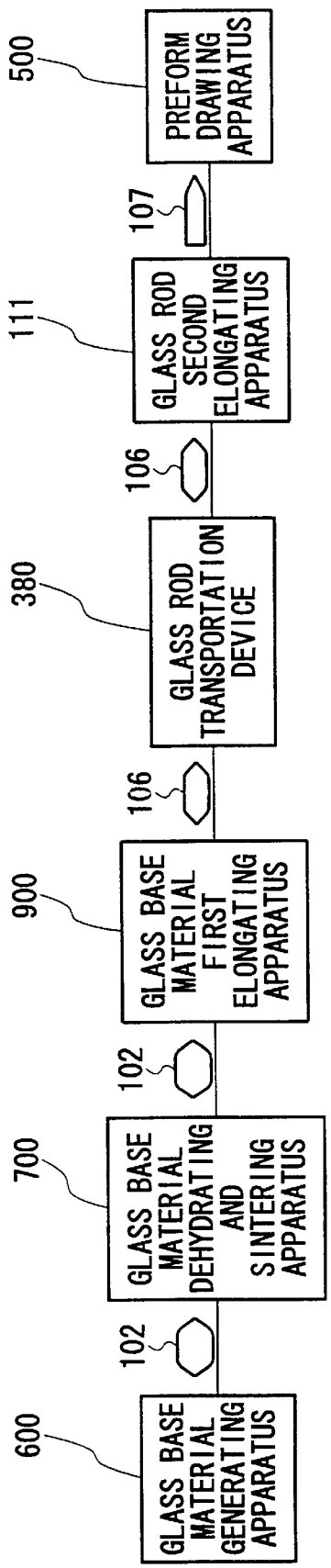
FIG. 1 shows a system of an optical fiber manufacturing apparatus of the. present invention.

FIG. 1 shows a system of an optical fiber manufacturing apparatus of the present invention. The system of the optical fiber manufacturing apparatus of the present invention comprises a glass base material generating apparatus 600 which generates a glass base material 102 being a base material of an optical fiber; a glass base material dehydrating and sintering apparatus 700 which dehydrates and sinters the glass base material 102; a glass base material first elongating apparatus 900, which elongates the glass base material 102 to generate a glass rod 106; a glass rod transportation device 380 which transports the glass rod 106; a glass rod second elongating apparatus 111 which elongates the glass rod 106 a second time to generate a preform 107; and a preform drawing apparatus 500 which draws the preform 107 to generate an optical fiber.

Figure 2:
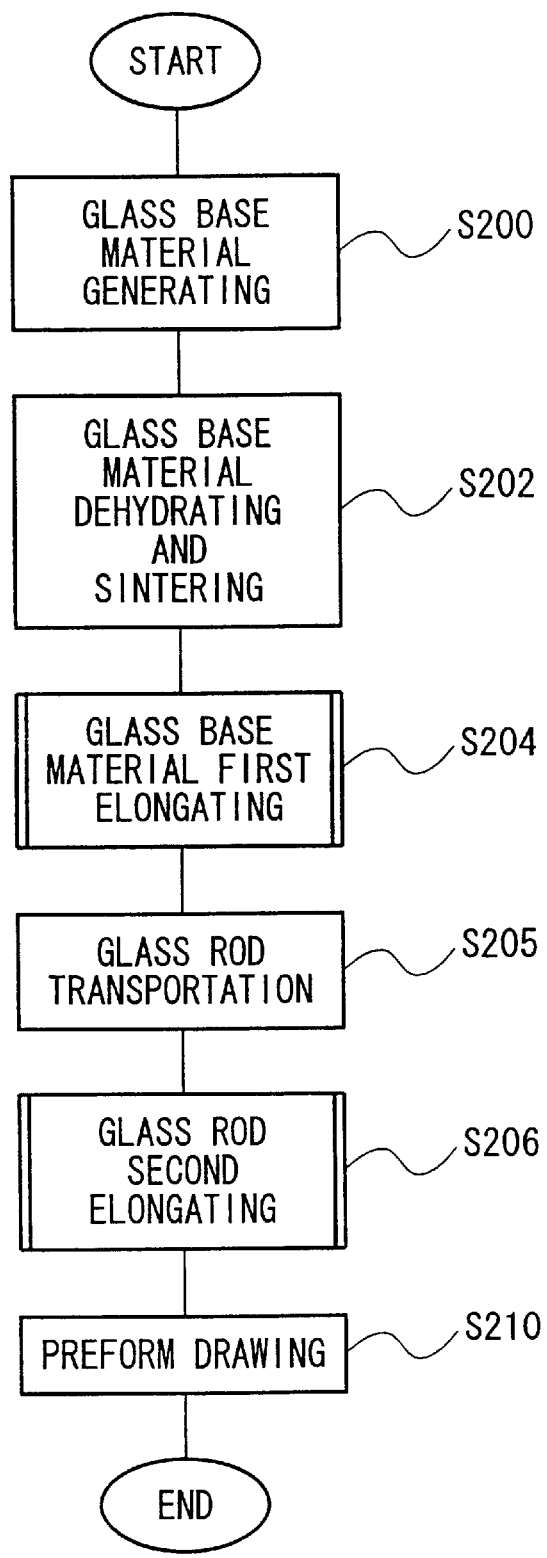
FIG. 2 shows an optical fiber manufacturing method of the present invention.

FIG. 2 shows an optical fiber manufacturing method of the present invention. The glass base material 102 is generated by the glass base material generating apparatus 600 using the VAD method, vapor-phase axial deposition method, or the like (S200). The glass base material 102 is then dehydrated within a chlorine gas atmosphere and sintered within an inert-gas atmosphere by the glass base material dehydrating and sintering apparatus 700 (S202).

The diameter of the glass base material 102 is normally 110 mm to 200 mm, compared to a diameter of 30 mm to 80 mm which is most practical for drawing to an optical fiber. Therefore, the dehydrated and sintered glass base material 102 is elongated firstly by the glass base :material first elongating apparatus 900 to produce a glass rod 106 (S204), which is a base material of an optical fiber. The glass rod 106 has a diameter 3 mm to 5 mm larger than the diameter convenient for drawing to an optical fiber, which is form 30 mm to 80 mm.

The glass rod 106 is transported by the glass rod transportation device 380 (S205). The glass rod 106 is then heated and elongated, the glass rod 106 is further flame polished to be removed the unevenness of the surface to be a preform 107 (S206) The preform 107 is heated and drawn to be a filament-like form by the preform drawing apparatus 500 to produce an optical fiber (S210).

Figure 3:
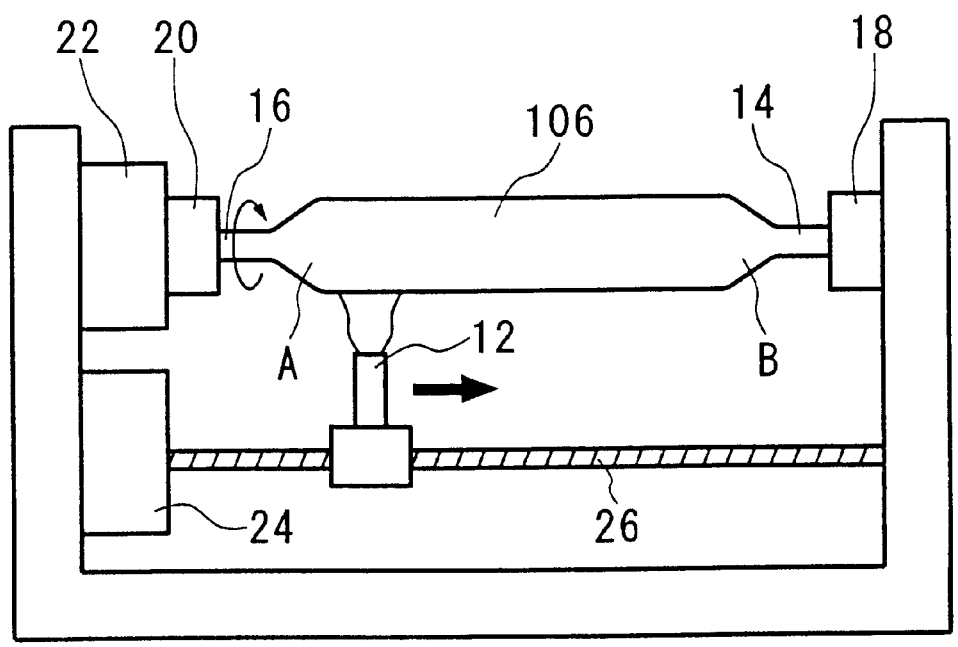
FIG. 3 shows a cross section view of the glass rod second elongating apparatus shown in FIG. 1.

FIG. 3 shows an cross section view of the glass rod second elongating apparatus 111 shown in FIG. 1. The optical fiber base material heat treatment method of the present invention uses the apparatus 111 to flame polish the glass rod 106. The optical fiber base material heat treatment method of the present invention performs continuously the first flame polishing and the second flame polishing.

The first flame polishing heats the surface of the optical fiber base material with flame while keeping a length of the optical fiber base material constant and the second flame polishing heats the surface of the optical fiber base material with flame by lower temperature than the temperature of the heating of the first flame polishing.

The apparatus 111 has a burner 12, a chuck 18 and 20, a motor 22 and 24, and a screw bar 26. Both ends of 14, 16 of the glass rod 106 are held by the chuck 18, 20. The glass rod 106 is rotated around the axis which connects the center of the chuck 18 and the center of the chuck 20. The glass rod 106 is rotated by the motor 22. The burner 12 is connected to the screw bar 26. The screw bar 26 is rotated by the motor 24. The burner 12 heats the glass rod 106 by moving relatively in the direction of the axis of the glass rod 106 along the screw bar 26. The glass rod 106 is heated by the burner 12 with an. acid hydrogen flame, which is combustion flame with hydrogen and oxygen.

The first flame polishing removes unevenness of the surface of the glass rod 106. And the second flame polishing removes residual strain inside the glass rod 106 and cloud of the surface of the glass rod 106 by the heating glass rod 106 with lower temperature than the temperature of the heating of the first flame polishing.

It is desirable that flame is combustion flame with combustible gas, which contains hydrogen and/or chain hydrocarbon, and supporting gas, which contains oxygen for supporting combustion. It is more desirable that flame is an acid hydrogen flame.

The first flame polishing starts from heating one end A of the glass rod 106. The burner 12 heats the surface of the glass rod 106 to 2000° C. with moving along the screw bar 26. The burner 12 is moved to another end B of the glass rod 106. Therefor the burner 12 can polish the whole surface of the glass rod 106 with flame. In this process, damages, unevenness and impure foreign substances of the surface of the glass rod 106 are removed, and the surface of the glass rod 106 becomes even. At this time, glass particles are attached to the surface of the glass rod 106 so that cloud occurs on the surface of the glass rod 106. Also, the strain is remained inside the glass rod 106. The first flame polishing can be a local flame polishing which flame polish the part of the glass rod 106 which has damages.

In the first flare polishing, a temperature of the surface of the glass rod 106 is made higher than 1600° C., which is softening temperature of synthesis quartz glass. Thereby, unevenness of the surface, that is damages, unevenness and impure foreign substances on the surface, are removed. However, the part of the surface of the glass rod 106 sometimes reaches about 2200° C., and cloud will be caused by glass particles attaching on the surface of the glass rod 106. In the second flame polishing, the surface of the glass rod 106 is heated to approximately softening temperature. Thereby, cloud and residual strain inside the glass rod 106 can be removed by the second flame polishing.

In the case of an optical fiber, the principal ingredient is quartz glass, it is desirable that the surface of the glass rod 106 is heated to approximately between 1800° C. and 2200° C. in the first flame polishing. It is more desirable that it approximately between 1900° C. and 2100° C. If the temperature of the surface is higher than 2200° C., dissociation of the quartz glass of the surface of the glass rod 106 becomes intense. On the other hand, if the temperature of the;surface is lower than 1800° C., damages, unevenness, and impure foreign substances cannot be removed from the surface of the glass rod 106.

After finishing the first flame polishing, the rotation direction of the screw bar 26 is reversed, so that the burner 12 is moved to the end A, which is a start point of heating. Then, the second flame polishing is performed. The burner 12 heats the surface of the glass rod 106 to 1500° C. with moving along the screw bar 26. The burner 12 moves to other end B of the glass rod 106, with flame polishing the whole surface of the glass rod 106. The whole surface of the glass rod 106 is heated with lower temperature than the temperature of the heating of the first flame polishing. Thereby, glass particles of the surface of the glass rod 106 can be removed. The surface of the glass rod 106 can be transparent, and residual strain inside the glass rod 106 can be removed.

It is desirable that the surface of the glass rod 106 is heated to approximately between 1000° C. and 1800° C. in the second flame polishing. It is more desirable that the surface of the glass rod 106 is heated to approximately between 1200° C. and 1600° C. If the temperature of the surface is higher than 1800° C., new cloud occurs on the surface of the glass rod 106. On the other hand, if the temperature of the surface of the glass rod 106 is lower than 1000° C., residual strain inside the glass rod 106 cannot be removed.

EXAMPLE

The glass rod 106 having an average diameter of 60 mm was installed on the glass rod second elongating apparatus 111. Black spots of impure foreign substances, the diameter of which were about 1 mm, were attached to the surface of the glass rod 106. The Black spots could not be removed by wiping with cloth. The glass rod 106 was rotated at the speed of 25 rpm. In the first flame polishing, the part of the glass rod 106, where the impure foreign substances was attached with, to 2000° C. by acid hydrogen flame with hydrogen 300 L/m and oxygen 170 L/m. By the first flame polishing, the impure foreign substances were removed, but glass particles were attached to the surface of the glass rod 106 so that white cloud was occurred on the surface of the glass rod 106.

Next, in the second flame polishing, the surface of the glass rod 106 was heated to 1500° C. by acid hydrogen flame with hydrogen 230 L/m and oxygen 130 L/m. The surface of the glass rod 106 was observed by irradiating the light of a halogen lamp or fluorescent light, then the surface of the glass rod 106 was transparent and even without damages, unevenness, impure foreign substances, and glass particles. Also, the strain inside the glass rod 106 was tested by qualitative test using a polarized light board, it was confirmed that the strain inside the glass rod 106 was removed.

The glass rod 106, the surface of which had a hole of about diameter 20 Mm, then the surface of the glass rod 106 was transparent and even, and the strain inside the glass rod 106 was removed.

COMPARATIVE EXAMPLE

Impure foreign substances attached to the surface of the glass rod 106, and had unevenness. Only the second flame polishing was performed heating the glass rod 106 to 1500° C. Then, the impure foreign substances and unevenness on the surface of the glass rod 106 couldn't be removed.

According to the optical fiber base material heat treatment method of the present invention, the glass rod, which is an optical fiber base material, of the high quality can be obtained. The surface of the optical fiber base material becomes transparent without cloud caused by glass particles. The surface of the optical fiber base material becomes even without damages, unevenness, and impure foreign substances. Furthermore, the optical fiber base material can be obtained without residual strain inside can be obtained. Because the optical fiber manufacture method of the present invention. uses the optical fiber base material treated by the heat treatment method of the present invention, the high quality optical fiber can be obtained.

What is claimed is:

1. A method of polishing an optical fiber base material, which is a base material of an optical fiber, with heat comprising:
   a first flame polishing which heats a surface of said optical fiber base material with a flame while keeping a length of said optical fiber base material constant; and
   a second flame polishing which heats said surface of said optical fiber base material with a flame to a temperature substantially between 1000° C. and 1800° C. to remove residual stress inside said optical fiber base material.

2. A method of polishing said optical fiber base material as claimed in claim 1, where in said first flame polishing removes uneven parts of said surface of said optical fiber base material by said heating.

3. A method of polishing said optical fiber base material as claimed in claim 2, wherein said first flame polishing at least heats locally said uneven parts of said surface of said optical fiber base material, and said second flame polishing heats entire surface of said optical fiber base material.

4. A method of polishing said optical fiber base material as claimed in claim 1, wherein said second flame polishing removes residual stress inside said optical fiber base material and cloud of said surface of said optical fiber base material by said heating.

5. A method of polishing said optical fiber base material as claimed in claim 1, wherein said first flame polishing heats said optical fiber base material so that a temperature of said surface of said optical fiber base material becomes approximately between 1800° C. and 2200° C.

6. A method of polishing said optical fiber base material as claimed in claim 1, wherein said flame is generated by burning combustible gas, which contains hydrogen, and supporting gas, which contain oxygen for supporting combustion.

7. A method of polishing said optical fiber base material as claimed in claim 1, wherein said flame is generated by burning combustible gas,: which contains chain hydrocarbon, and supporting gas, which contains oxygen for supporting combustion.

8. A method as claimed in claim 1, wherein said second flame polishing heats said optical fiber base material so that the temperature of said surface of said optical fiber base material becomes approximately between 1200° and 1600° C.

9. A method for manufacturing an optical fiber comprising:
   a first flame polishing which heats a surface of an optical fiber base material, which is a base material of said optical fiber, with a flame while keeping a length of said optical fiber base material constant;
   a second flame polishing which heats said surface of said optical fiber base material with a flame to a temperature substantially between 1000° C. and 1800° C. to remove residual stress inside said optical fiber base material; and drawing said optical fiber base material to a filament-like form by heating said optical fiber base material to generate said optical fiber.

10. A method for manufacturing an optical fiber as claimed in claim 9, wherein, said first flame polishing removes uneven parts of said surface of said optical fiber base material by said heating.

11. A method for manufacturing an optical fiber as claimed in claim 10, wherein said first flame polishing at least heats locally said uneven parts of said surface of said optical fiber base material, and said second flame polishing heats entire surface of said optical fiber base material.

12. A method of manufacturing an optical fiber as claimed in claim 9, wherein said second flame polishing removes residual stress inside said optical fiber base material and cloud of said surface of said optical fiber base material by said heating.

13. A method for manufacturing an optical fiber as claimed in claim 9, wherein said first flame polishing heats said optical fiber base material so that a temperature of said surface of said optical fiber base material becomes approximately between 1800° C. and 2200° C.

14. A method for manufacturing an optical fiber as claimed in claim 9, wherein said flame is generated by burning combustible gas, which contains hydrogen, and supporting gas, which contains oxygen for supporting combustion.

15. A method for manufacturing an optical fiber as claimed in claim 9, wherein said flame is generated by burning combustible gas, which contains chain hydrocarbon and supporting gas, which contains oxygen for supporting combustion.

16. A method as claimed in claim 9, wherein said second flame polishing heats said optical fiber base material so that the temperature of said surface of said optical fiber base material becomes approximately between 1200° and 1600° C.

* * * * *